Oct. 23, 1962 J. B. WEST 3,059,756
ARTICLE TRANSFER DEVICE
Filed April 5, 1960 4 Sheets-Sheet 1

INVENTOR.
JOHN B. WEST
BY
Albert J. Kramer
ATTORNEY

Oct. 23, 1962    J. B. WEST    3,059,756
ARTICLE TRANSFER DEVICE
Filed April 5, 1960    4 Sheets-Sheet 2

INVENTOR.
JOHN B. WEST
BY Albert J. Kramer
ATTORNEY

Oct. 23, 1962    J. B. WEST    3,059,756
ARTICLE TRANSFER DEVICE
Filed April 5, 1960    4 Sheets-Sheet 3

INVENTOR.
JOHN B. WEST
BY
Albert G. Kramer
ATTORNEY

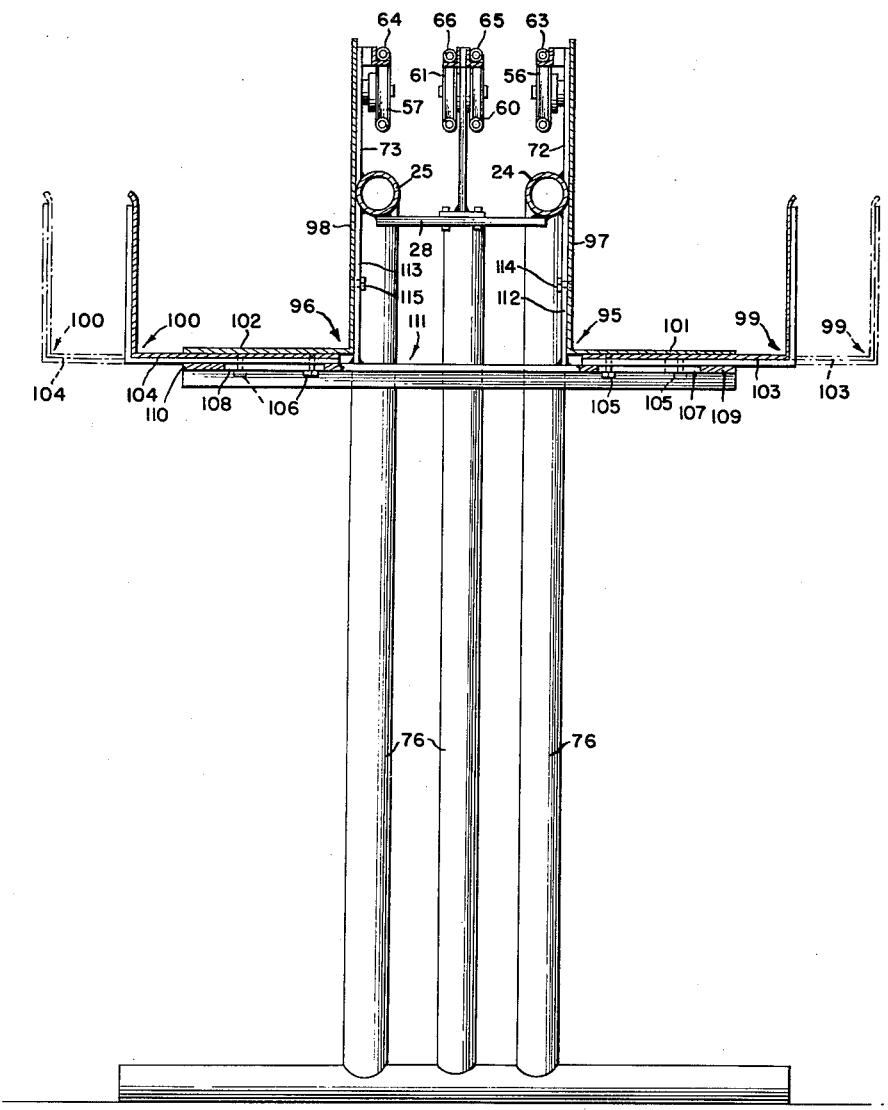

United States Patent Office 3,059,756
Patented Oct. 23, 1962

3,059,756
ARTICLE TRANSFER DEVICE
John B. West, Pikesville, Md., assignor to Universal Machine Co., Inc., Baltimore, Md., a corporation of Maryland
Filed Apr. 5, 1960, Ser. No. 20,104
4 Claims. (Cl. 198—162)

This invention relates to transfer devices and it is more particularly concerned with devices for transferring conical objects from one station to another.

In copending application for patent, Ser. No. 815,883, filed May 26, 1959, there is disclosed a machine for automatically manufacturing conical ice cream novelty products and an object of this invention is the provision of a transfer device for receiving such products discharged by the machine and conveying them to a packing station where packers can place the products in boxes or cartons to be sold.

Another object of the invention is the provision of a transfer device of the type mentioned which quickly carries the objects to be conveyed away from the machine a given distance and then orients and accumulates them on a relatively slow moving belt to assure both a convenient position of the product and sufficient time to pick the objects up and arrange them in the packing boxes. Quickly carrying the product away from the machine, assures the proper discharge of the product by minimizing the possibility of jamming which may otherwise occur when relying on manual efforts alone to keep the discharge chute free and clear.

A further object of this invention is to discharge the product in such a convenient manner that a subsequent increase in efficiency of the packing operations may be realized.

A still further object of this invention is to orient quickly the products to a vertical position after discharge to prevent spillage and/or flowing of the contents.

A still further object of this invention is to provide means at convenient stations for supporting the boxes while being filled with the products by the packers.

A still further object of the invention is the provision of such a device which receives the products to be conveyed in a manner to minimize breakage and other damage thereto.

A still further object of the invention is the provision of a device of the type mentioned which is reliable, long wearing, easy to keep in working order and easy to keep in a sanitary condition.

These and still further objects, features and advantages of the invention will be apparent from the following description considered together with the accompanying drawing, in which.

Figure 1:
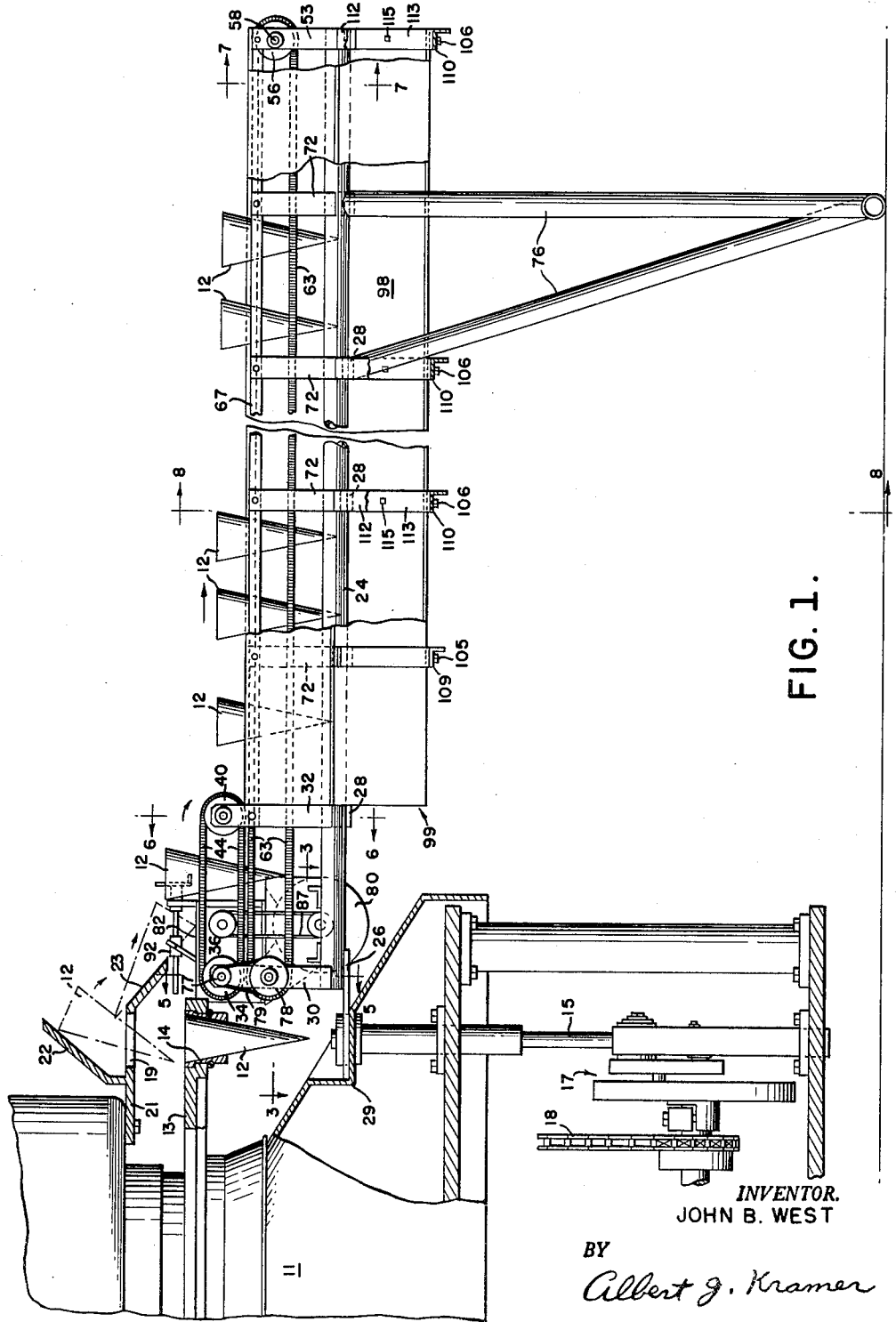
FIG. 1 is a side elevational view, partly broken away, of an embodiment of the invention attached to the delivery side of a novelty manufacturing machine of the type referred to, said machine being shown fragmentarily.
Figure 4:
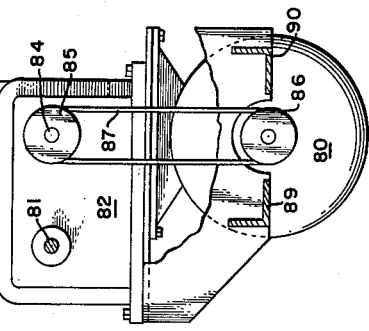
Figure 2:
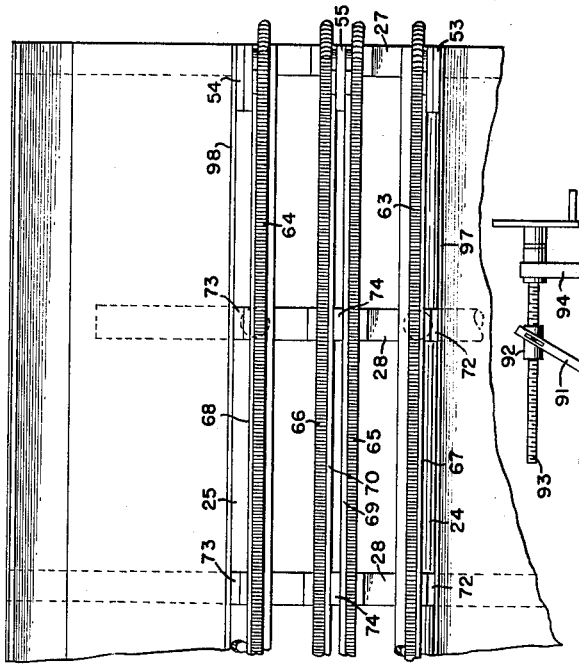
FIG. 2 is a top plan view of FIG. 1 with some additional parts broken away.
Figure 3:
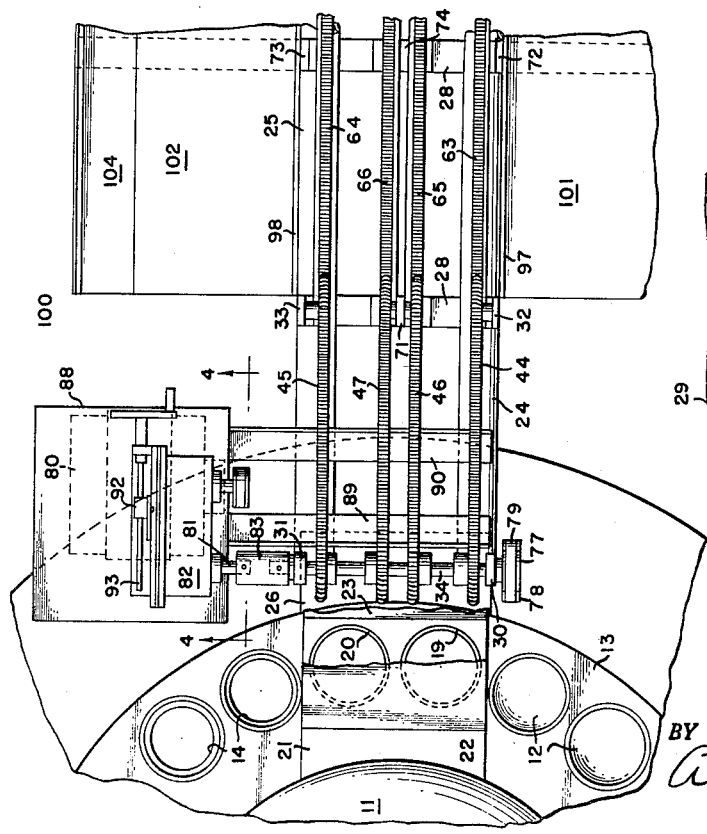
Figure 5:
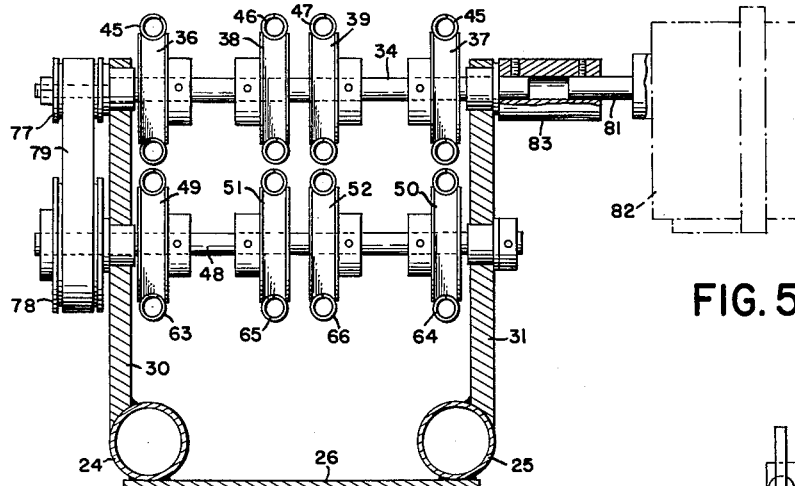
Figure 6:
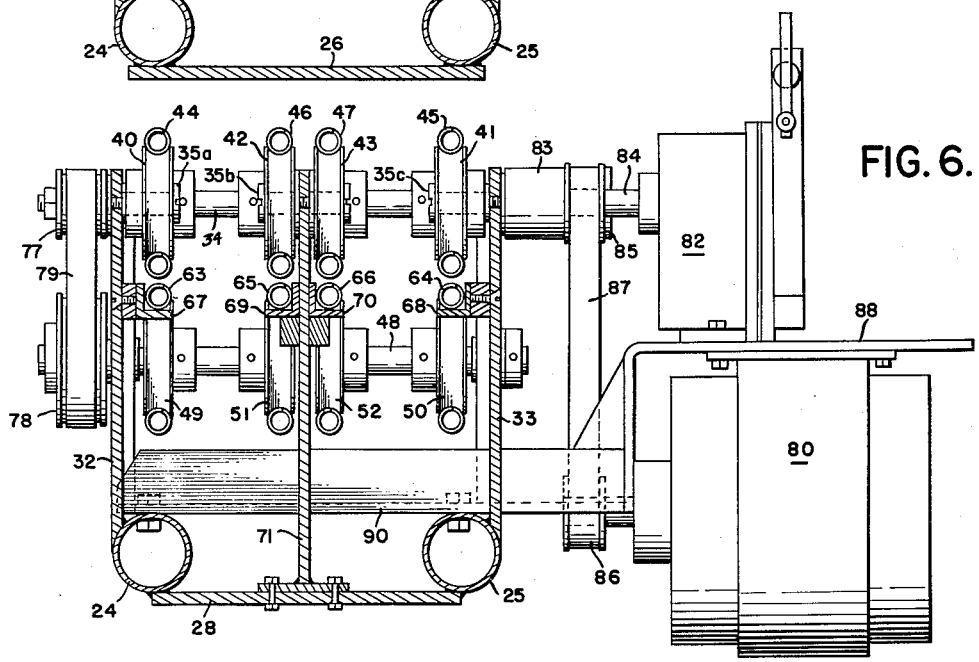
Figure 7:
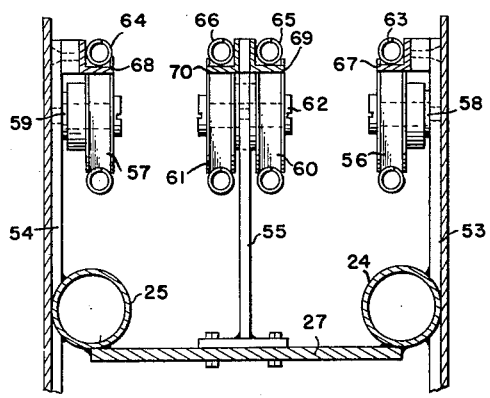

FIG. 3 is a section along the line 3—3 of FIG. 1.
FIG. 4 is a section along the line 4—4 of FIG. 2.
FIG. 5 is a section along the line 5—5 of FIG. 1.
FIG. 6 is a section alonf the line 6—6 of FIG. 1.
FIG. 7 is a section along the line 7—7 of FIG. 1.
FIG. 8 is a section along the line 8—8 of FIG. 1.

Referring with more particularity to the drawing in which like numerals designate like parts, the embodiment is illustrated in connection with a machine 11 for manufacturing conical ice cream novelty products 12. The machine comprises a horizontal rotary wheel 13 provided with apertures 14 for holding the conical members. At the discharge station there are provided a pair of vertical push bars 15 and 16, that are reciprocated up and down by transmission means 17 powered through a chain drive 18 or any other suitable means. On the upward stroke of the bars 15 and 16, they contact the bottom of a pair of completed conical products 12 in adjacent apertures 14 of the wheel 13 and elevate them through corresponding openings 19 and 20 in a plate 21. Above the openings 19 and 20 there is disposed an angular hood 22 which tips the products forward as they rise under the action of the bars 15 and 16, whereby they fall forward over a discharge chute 23, said chute comprising a downwardly projecting extension of the plate 21.

The embodiment of the present invention is adapted to receive the products from the chute 23 and carry them to a station convenient for removal by the packers. It comprises a frame structure including bottom longitudinal bars 24 and 25 laterally spaced apart. The inner ends of these bars are welded or otherwise secured to the front end of a bottom plate 26 and the outer end is secured by similar means to cross bars 27. Intermediate cross bars 28 are also provided at intervals between the plate 26 and bar 27. The device is attached to the machine 11 by means of the plate 26 which is secured to a shelf 29 surrounding the reciprocating vertical bars 15 and 16.

At the inner ends of the longitudinal bars 24 and 25, there are secured by welding or otherwise, a pair of uprights or standards 30 and 31, respectively. Spaced forwardly from these uprights is another pair of similar uprights 32 and 33. The upper ends of the uprights 30 and 31 rotatably support a cross shaft 34 and the upper ends of the uprights 32 and 33 rotatably support cross shafts 35a and 35c respectively, substantially as shown. The shaft 34 is provided with a pair of outer pulleys 36 and 37 and a pair of inner pulleys 38, 39. The shafts 35a and 35c are provided with a corresponding set of outer pulleys 40, 41, respectively, and the center shaft 35b with two inner pulleys 42, 43. The pulleys are all secured to their respective shafts for rotation therewith by any conventional means. Between the corresponding outer pulleys and inner pulleys of the shafts 34 and 35, there are disposed belts 44, 45 and 46, 47, respectively. Each of these belts is in the form of an endless coil spring which is supported by the pulleys. The spacing between the outer and inner pulleys are such as to permit each pair of inner and outer belts to straddle and support the conical objects discharged by the machine 11. See FIG. 1.

Directly below the shaft 34, there is disposed a lower shaft 48 on the standards 30 and 31. To the shaft 48 there are secured a pair of outer pulleys 49, 50 directly below the pulleys 36, 37 and a pair of inner pulleys 51, 52 directly below the pulleys 38, 39, respectively.

At the outer end of the bars 24 and 25 there are provided uprights 53, 54 on the outer sides and a middle standard 55 is secured to the cross bar 27. The uprights 53, 54 carry outer pulleys 56, 57 on stub shafts 58, 59, respectively, while the middle standard 55 carries inner pulleys 60, 61 on a stub shaft 62.

Outer belts 63 and 64 are supported by and between outer pulleys 49, 56 and 50, 57, respectively. Inner belts 65 and 66 are supported on and between inner pulleys 51, 60 and 52, 61, respectively. The belts 63, 64 and 65, 66 are, thus, directly beneath the belts 44, 45 and 46, 47, respectively.

The upper reaches of the outer belts 63, 64 are supported by longitudinal angle bars 67 and 68 between the uprights 32 and 53 and the corresponding uprights 33 and 54.

The upper reaches of the inner belts 65 and 66 are supported by longitudinal angle bars 69, 70 between the middle standard 55 and a middle standard 71 carried by the bar 28 and projecting upward to support the center of the shafts 35b and 48.

Bracing uprights 72 and 73 are provided at intervals on either side between the bars 24, 25 and the angle bars 67, 68. Interior bracing uprights 74 are similarly provided at longitudinal intervals for the interior angle bars 69, 70.

The outer end of the device may be supported by any suitable means, such as the legs 76.

The upper shaft 34 is geared to the lower shaft 48 by means of a relatively small pulley 77 on the upper shaft connected to a relatively large pulley 78 on the lower shaft by a belt 79.

The upper shaft 34 is driven by a motor 80 through the output shaft 81 of a transmission 82. The shaft 81 is connected to the shaft 34 by means of a coupling 83. The input shaft 84 of the transmission 82 has a pulley 85 which is geared to the take-off pulley 86 of the motor by a belt 87.

The transmission and motor are mounted on a bracket 88 at the outer end of arms 89 and 90 secured to the bars 24 and 25 extending outwardly to one side, substantially as shown.

The transmission unit is of a conventional variable speed type and has a shiftable lever 91 for varying the speed of the output shaft 81. The outer end of the lever 91 is pivoted to a nut 92 on a lead screw 93 mounted on a stanchion 94 of the transmission unit.

By these means the conical articles, as they are discharged by the machine 11, are received by the rapidly moving upper belts 44, 45 and 46, 47 and quickly moved away from the machine to the lower moving belts 63, 64 and 65, 66 from which they are manually removed by packers and placed in cartons or boxes.

Tables for supporting the boxes (not shown) into which the conical articles are to be packed are disposed on either side of the conveyors whereby persons performing the packing operations can work on both sides as needed. These tables comprise inner longitudinal angular members 95 and 96, the vertical sides 97 and 98 thereof, respectively, being secured by welding or otherwise to the uprights 72 and 73. The tables also comprises outer longitudinal angular members 99 and 100.

The angular members 95 and 96 have horizontal sections 101 and 102, respectively, which overlie corresponding horizontal sections 103 and 104 of the outer angular members 99 and 100. These outer members are held in position by bolts 105 and 106 threadedly engaged with the horizontal sections 103 and 104, respectively, said bolts passing through slots 107 and 108 in horizontal arms 109 and 110 of a bracket 111. The vertical arms 112 and 113 of these brackets are also bolted to the inner angular members 95 and 96 by bolts 114 and 115, respectively.

By virtue of the slots 107 and 108, the width of the tables can be adjusted, as indicated by the dotted lines of FIG. 8 by loosening the bolts 105 and 106, repositioning the members 99 and 100 within the limitations of the slots 107 and 108 and then retightening the bolts.

Having thus described my invention, I claim:

1. A device for receiving conical objects to be packaged at a first station and transferring them to a packing station comprising a relatively long lower pair of narrow endless conveyor belts spaced apart between said stations to straddle the objects and support them at their upper ends, a second upper pair of narrow relatively short endless conveyor belts directly above and vertically aligned with said lower belts at the first station, a frame supporting said belts between said stations, a packing table secured to and carried by the frame at the second station, and means for driving at a relatively greater speed the upper belts in unison and for driving at a relatively slower speed the lower belts in unison, the space between the one pair of belts being adjacent to and in direct vertical alignment with the space between the other pair of belts.

2. A unit for receiving conical objects to be packaged from a discharge station and transferring them to a packing station comprising members forming a longitudinal structural frame extending between the stations, a relatively long lower pair of narrow endless conveyor belts supported on the frame between said stations, said belts being spaced apart to straddle the conical products and support them at their upper ends, a second upper pair of narrow relatively short endless conveyor belts directly above and vertically aligned with said lower belts at the discharge station, a frame supporting said belts between said stations, a packing table secured to and carried by the frame at the packing station, and means for driving said upper belts in unison and, at a slower speed said lower belts in unison, the space between one pair of belts being adjacent to and in direct vertical alignment with the space between the other pair of belts.

3. A unit as defined by claim 2 and variable speed means for driving said belts.

4. A unit as defined by claim 2 in which the belts are endless coil springs.

References Cited in the file of this patent

UNITED STATES PATENTS

| | | |
|---|---|---|
| 1,154,562 | Cowley | Sept. 21, 1915 |
| 1,175,190 | Stuart | Mar. 14, 1916 |
| 1,456,858 | Partridge | May 29, 1923 |
| 2,252,498 | Flaws | Aug. 12, 1941 |
| 2,769,523 | Ochwat | Nov. 6, 1956 |
| 2,857,042 | Gaubert | Oct. 21, 1958 |
| 2,959,271 | Adamson | Nov. 8, 1960 |